US006990571B2

(12) United States Patent
Vavro

(10) Patent No.: US 6,990,571 B2
(45) Date of Patent: Jan. 24, 2006

(54) METHOD FOR MEMORY OPTIMIZATION IN A DIGITAL SIGNAL PROCESSOR

(75) Inventor: David K. Vavro, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 09/842,536

(22) Filed: Apr. 25, 2001

(65) Prior Publication Data

US 2002/0188835 A1 Dec. 12, 2002

(51) Int. Cl.
*G06F 9/38* (2006.01)

(52) U.S. Cl. ...................................... 712/241; 712/208

(58) Field of Classification Search ................ 712/241, 712/208–209, 229, 205–206, 32–34; 345/505, 345/506, 519; 711/105, 113, 118

See application file for complete search history.

(56) References Cited

U.S. PATENT DOCUMENTS

| | | | | |
|---|---|---|---|---|
| 5,682,491 | A * | 10/1997 | Pechanek et al. | 712/209 |
| 5,935,241 | A * | 8/1999 | Shiell et al. | 712/240 |
| 5,944,841 | A * | 8/1999 | Christie | 714/38 |
| 6,006,320 | A * | 12/1999 | Parady | 712/36 |
| 6,047,363 | A * | 4/2000 | Lewchuk | 711/213 |
| 6,615,338 | B1 * | 9/2003 | Tremblay et al. | 712/24 |

FOREIGN PATENT DOCUMENTS

JP 6-237377 A * 8/1994

* cited by examiner

*Primary Examiner*—Henry W. H. Tsai
(74) *Attorney, Agent, or Firm*—Blakely, Sokoloff, Taylor & Zafman LLP

(57) ABSTRACT

According to one embodiment, a processing element is disclosed. The processing element includes an instruction buffer, a first most often (MO) buffer coupled to the instruction buffer and an execution unit coupled to the instruction buffer and the first MO buffer. The execution unit is adaptable to execute instructions stored within the first MO buffer based upon a first predetermined profile.

22 Claims, 4 Drawing Sheets

METHOD FOR MEMORY OPTIMIZATION IN A DIGITAL SIGNAL PROCESSOR

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to memory management.

BACKGROUND

Many embedded systems such as digital cameras, digital radios, high-resolution printers, cellular phones, etc. involve the heavy use of signal processing. Such systems are based on embedded Digital Signal Processors (DSPs). An embedded DSP typically integrates a processor core, a program memory device, and application-specific circuitry on a single integrated circuit die. Therefore, because of size constraints, memory in an embedded DSP system is often a limited resource.

A processing core in a DSP typically executes instructions in a tight loop and performs many of the same types of operations. Consequently, many of the same instructions executed in the core are repetitively fetched from memory. Notwithstanding looping, function calls and repeat instructions, there are instances where identical instructions are fetched. Therefore, an optimization method that utilizes repetitive and identical function calls by a processor core to reduce the size of the generated code in order to optimize memory devices used in embedded systems is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
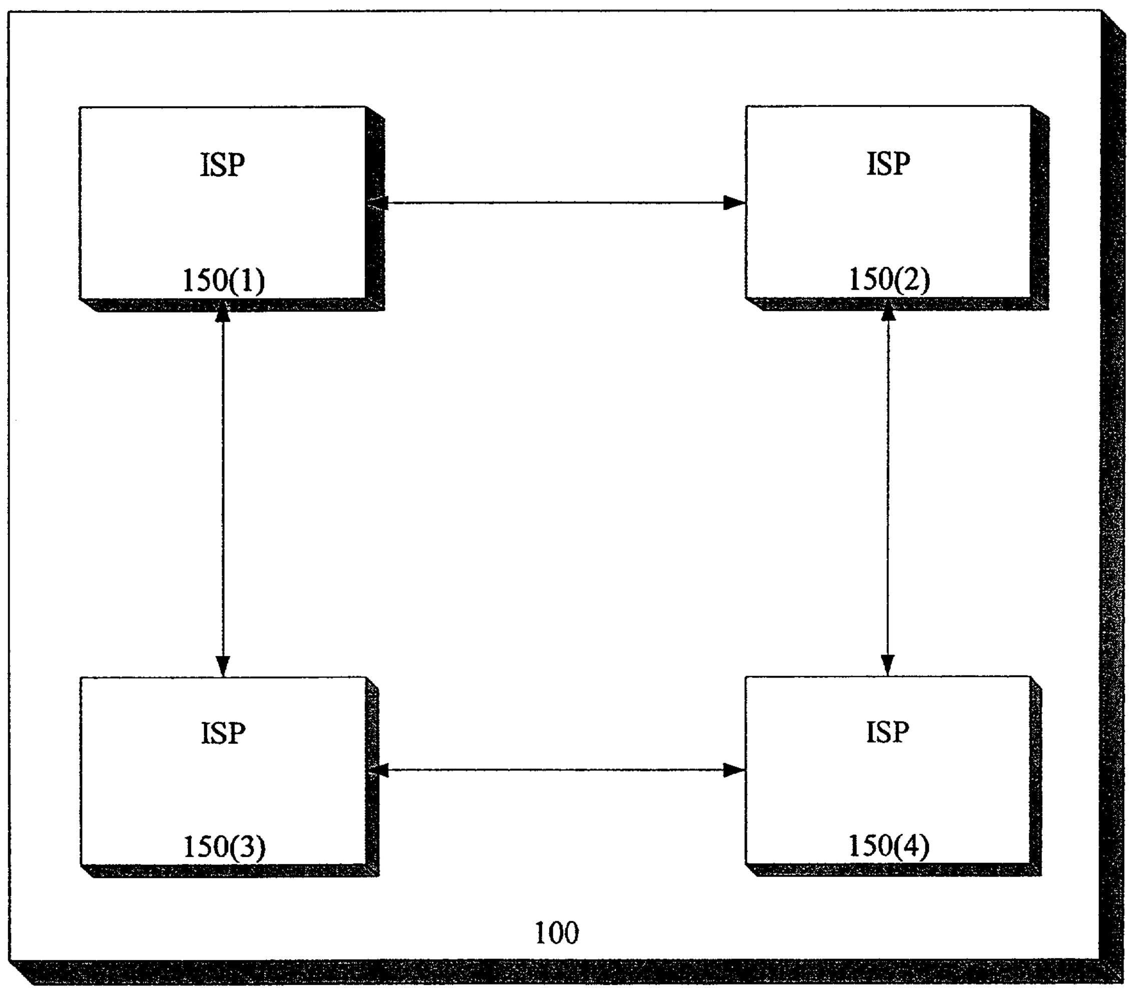
FIG. 1 is a block diagram of one embodiment of a digital signal processor.

A method for memory optimization in a digital signal processor is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 is a block diagram of one embodiment of a digital signal processor (DSP) 100. DSP 100 includes image signal processors (ISPs) 150(1)–150(4). ISPs 150(1)–150(4) are implemented to process (e.g., encode/decode) images and video. In particular, the ISPs 150 are capable of performing image transform processing of encoded image signals spatially or on a time series basis. Each ISP 150 is coupled to another ISP 150 via a bus.

In one embodiment, DSP 100 is implemented within a photocopier system. However, in other embodiments, DSP 100 may be implemented in other devices (e.g., a digital camera, digital radio, high-resolution printer, cellular phone, etc.). In addition, although DSP 100 is described in one embodiment as implementing ISPs 150, one of ordinary skill in the art will appreciate that other processing devices may be used to implement the functions of the ISPs in other embodiments. Further, in other embodiments, other quantities of ISPs 150 may be implemented.

Figure 2:
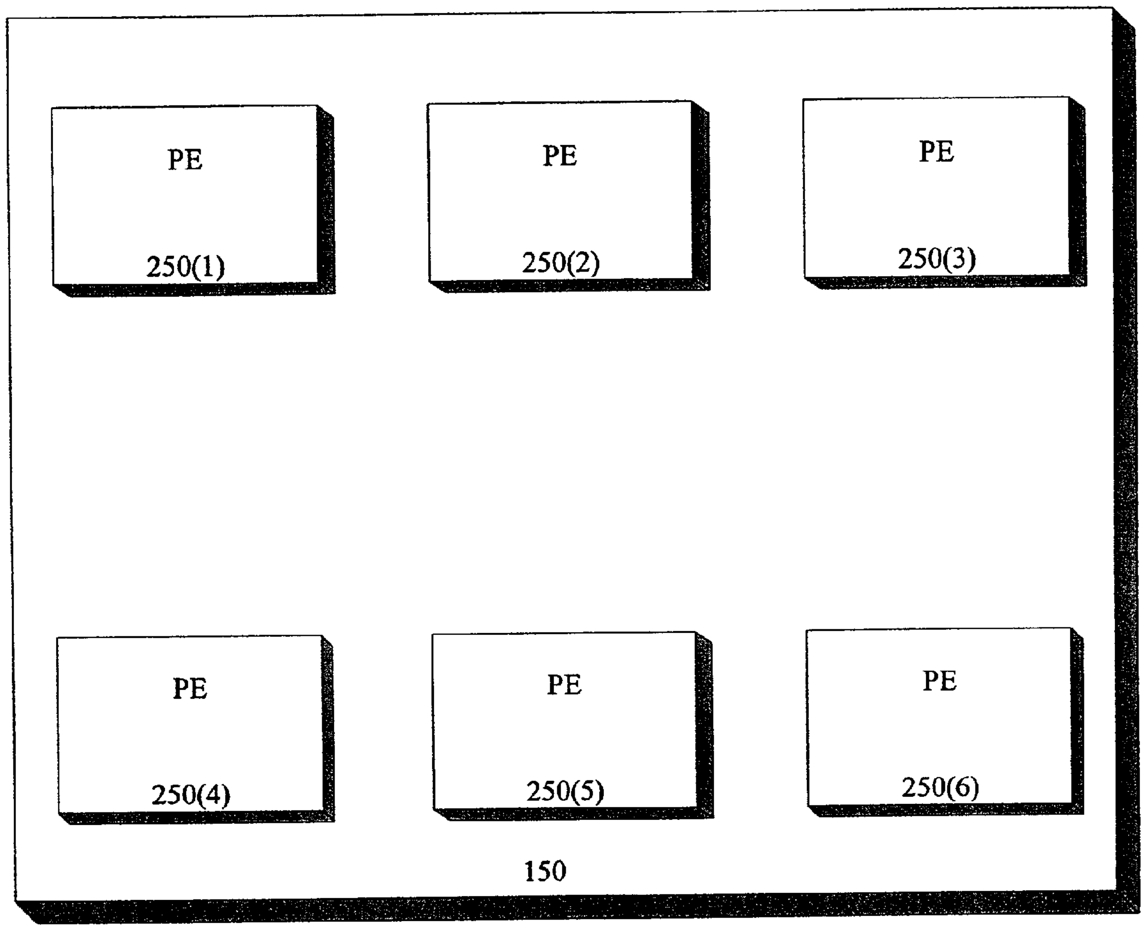
FIG. 2 is a block diagram of one embodiment of an image signal processor.
Figure 3:
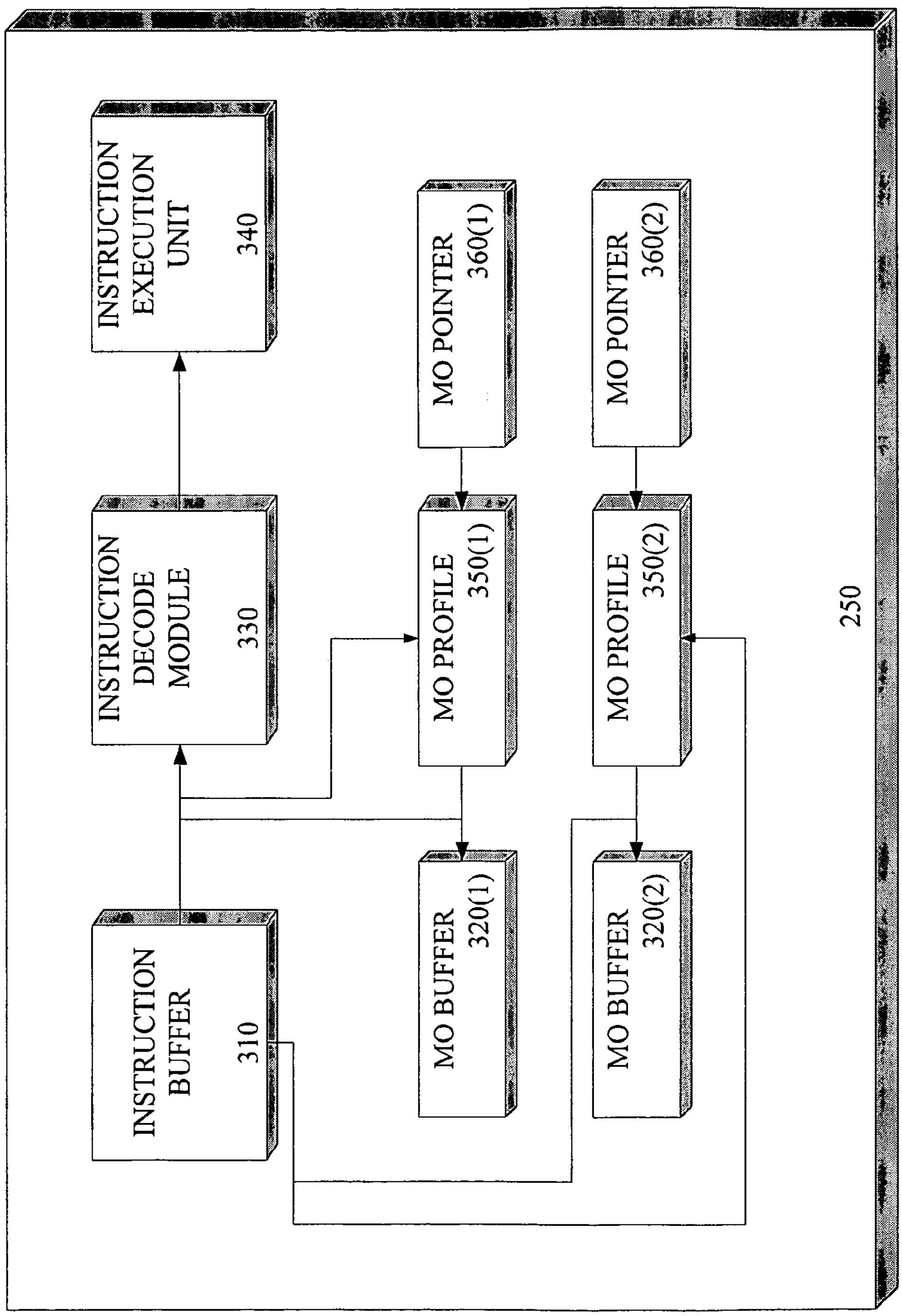
FIG. 3 is a block diagram of one embodiment of a processing element.

FIG. 2 is a block diagram of one embodiment of an ISP 150. ISP 150 includes processing elements 250(1)–250(6). The processing elements 250 are implemented in order to execute instructions received at respective ISPs 150. According to one embodiment, each processing element 250 executes its own instruction stream with its own data. In a further embodiment, high speed processing is enabled by operating each processing element 250 in parallel. FIG. 3 is a block diagram of one embodiment of a processing element 250.

Referring to FIG. 3, processing element 250 includes an instruction buffer 310, most often (MO) buffers 320(1) and 320(2), an instruction decode module 330 and instruction execution unit 340. In addition, processing element 250 includes MO profile buffers 350(1) and 350(2), and MO pointers 360(1) and 360(2). Instruction buffer 310 provides storage for pre-fetched instructions received at processing element 250. Once an instruction is stored in buffer 310, the instruction is ready to be executed. According to one embodiment, instruction buffer 310 is a dynamic random access memory (DRAM). However, one of ordinary skill in the art will appreciate that instruction buffer 310 may be implemented using other memory devices.

MO buffers 320 are used to store instructions that are commonly and repetitively executed at execution unit 340. According to one embodiment, an instruction that is to be stored in a MO buffer 320 includes information that indicates whether the instruction is to be stored in buffer 320(1) or 320(2). In a further embodiment, one bit is included in the instruction for each most often buffer 320 being implemented. Thus, for the illustrated embodiment, a two bit code is used to indicate which buffer 320 an instruction is to be stored, if any. In such an embodiment, a binary 00 included within an instruction indicates that no most often storage is to be performed. Similarly, a binary 01 indicates that the instruction is to be stored in most often buffer 320(1) and a binary 10 indicates that the instruction is to be stored in most often buffer 320(2).

Decode module 330 translates received instruction code into an address in buffer 310 where the instruction begins. Decode module 330 may also be used in the instruction set to control most often storage. In one embodiment, binary decoding is used to determine in which MO buffer 340 an instruction is to be stored. For example, a "Move" instruction may have a binary decoding of 8 (e.g., 1000) in the instruction type decode field.

In order to add most often capability, the number of the MO buffer 320 to which the instruction is to be stored is added to the binary instruction type decode field. Accordingly, the binary type field would include 1000 for no most often storage, 1001 (e.g., 1000+01) for most often storage in MO buffer 320(1) and 1010 (e.g., 1000+10) for most often storage in MO buffer 320(2). According to one embodiment, decode module 330 is a read only memory (ROM). However, in other embodiments, decode module 330 may be implemented using other combinatorial type circuitry. One of ordinary skill in the art will appreciate that most often decoding may be implemented using other methods.

Execution unit 340 executes received instructions by performing some type of mathematical operation. For example, execution unit 340 may implement the move function wherein the contents of an addressed storage location are moved to another location. MO profile buffers 350 store a sequence of binary bits that indicate a profile of when an instruction stored in a most often buffer 320 is to be executed in a given set of instruction fetch cycles. According to one embodiment, an instruction fetch cycle is a clock cycle in which a new instruction can be fetched from memory.

In one embodiment, each bit in the profile corresponds to one instruction fetch cycle. For example, a profile buffer 350 may store the profile 000011000000. If a profile bit is set to be active (e.g., a logical 1), the instruction stored in the corresponding most often buffer 320 is executed during the corresponding instruction fetch cycle. However, if a profile bit is set to be inactive, a new instruction it fetched from instruction buffer 310. Therefore, using the example profile illustrated above, the instruction stored in the corresponding most often buffer 320 is executed during the fifth and sixth instruction fetch cycles. MO pointers 360 point to profile bits stored in the corresponding profile buffers 350. Each pointer gets incremented in each instruction fetch cycle. If a pointer points to the end of a profile (e.g., the last profile bit), the instruction bits expire and there will be no further execution of the most often instructions.

According to one embodiment, an assembler software tool is used to analyze the instruction program of each processing element 250 after programming in order to ascertain the instructions that are most often used. The detail of the most often used instructions is added to the instructions in a preprocessing stage. Moreover, the assembler tool may also determine which is most common and whether multiple most often instructions can be implemented (e.g., determine how many MO buffers 320 are available). According to a further embodiment, the instruction that is determined to be the most often used instruction can be dynamically changed and as a new code is fetched. For example, a new instruction may be loaded into most often buffer 320(1) before (or after) a profile for a previous most often instruction has expired.

Figure 4:
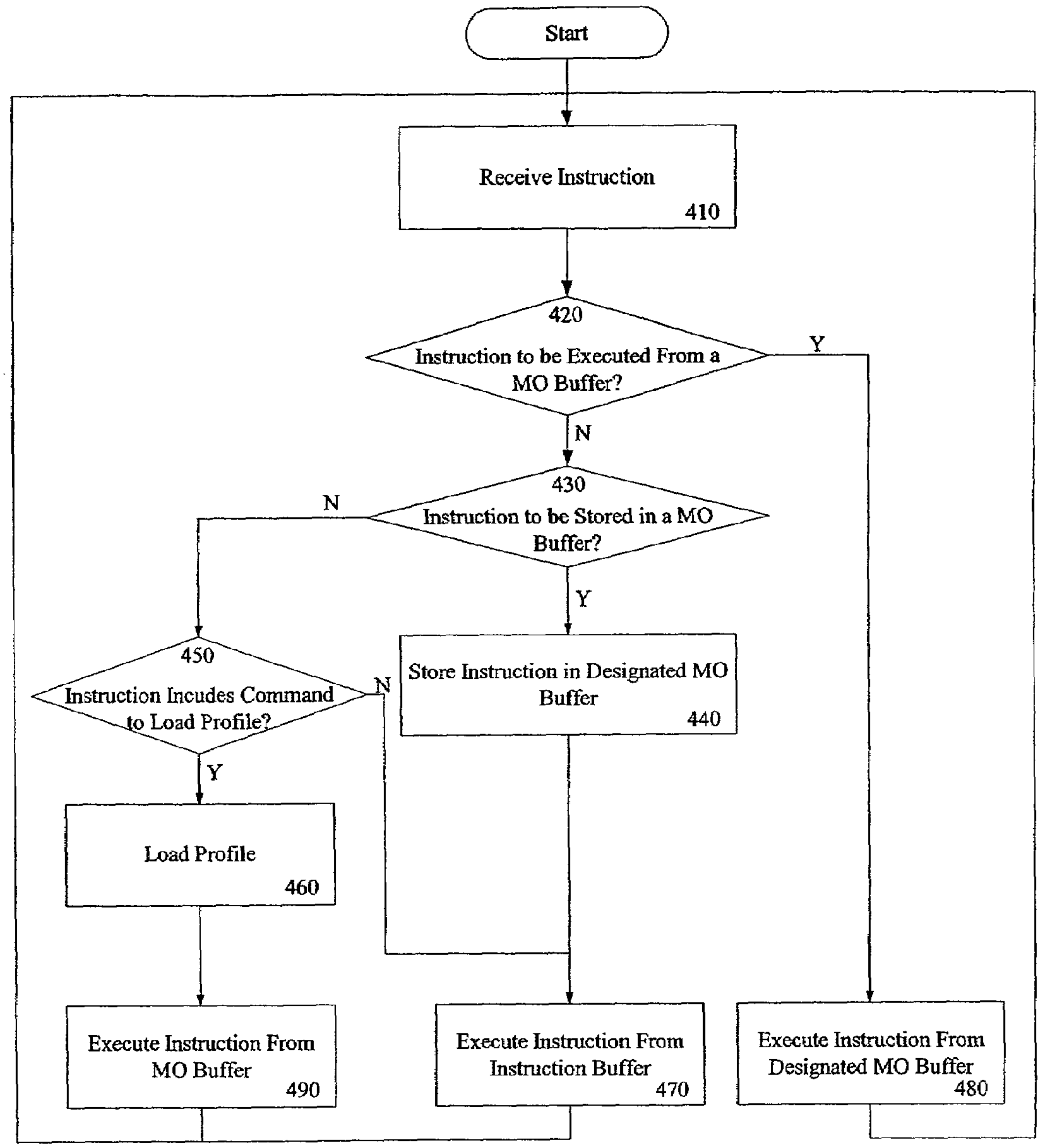
FIG. 4 is a flow diagram for one embodiment of the operation of executing instructions at a processing element.

FIG. 4 is a flow diagram for one embodiment of the operation of executing instructions at a processing element 250. At processing block 410, an instruction is received at decode module 320 to be decoded. As described above, the encoded instruction includes information regarding most often storage. At processing block 420, it is determined whether a MO pointer 360 points to a profile bit in a profile buffer 350 indicating that the instruction is to be executed from a MO buffer 320. If the pointer 360 is pointing to an active profile bit, the instruction is executed from the designated MO buffer 320, processing block 480.

However, if the pointer 360 is pointing to an inactive profile bit, it is determined whether the instruction is to be stored in a MO buffer 320, processing block 430. If the instruction is designated to be stored in a MO buffer 320, the instruction is stored in the applicable MO buffer 320, processing block 440. At process block 470, the instruction is executed from instruction buffer 310. If, however, the instruction is not designated to be stored in a MO buffer 320, it is determined whether the instruction includes a command to load a MO profile into a profile buffer 350, processing block 450.

If the instruction includes a command to load a MO profile into a profile buffer 350, the profile is loaded into the designated profile buffer 350, processing block 460. At processing block 490, the instruction is executed from the MO buffer 320 corresponding to the currently loaded profile buffer 350. If the instruction does not include a command to load a MO profile into a profile buffer 350, the instruction is executed from instruction buffer 310, processing block 470. The above process enables instruction code to be compressed, thus reducing the number of instructions that are fetched from memory. Moreover, the instruction compaction method is implemented without any additional clock cycles since during the profile load instruction the previously loaded MO buffer 320 instruction is executed in addition to the profile being loaded into the corresponding MO profile buffer 350.

Table 1 below illustrates one example of an instruction execution sequence at a processing element 250. In this example, the instruction width is 16 bits, with 12 bits used for profiling in order to execute most often instruction cycles.

TABLE 1

| | Instruction | Assignments for MO buffers 1 and 2 | Profile & Executed MO Pointer |
|---|---|---|---|
| 1 | move a | execute a and store instruction in MO buffer 320(1) | 000000000000, 000000000000 |
| 2 | add b | add b | 000000000000, 000000000000 |
| 3 | move a | execute a from MO buffer 320(1) and load profile in MO profile 350(1) | 000110000000, 000000000000 |
| 4 | move b | execute b and store instruction in MO buffer 320(2) | 000110000000, 000000000000 |
| 5 | move b | execute b from MO buffer 320(2) and load profile in MO profile 3 50(2) | 000110000000, 000110000100 |
| 6 | add c | add c | 000110000000, 000110010100 |
| 7 | move a | no fetch | 000110000000, 000110010100 |
| 8 | move a | no fetch | 000110000000, 000110010100 |
| 9 | move b | no fetch | 000110000000,000110010100 |
| 10 | move b | no fetch | 000110000000, 000110010100 |
| 11 | move c | execute c and store instruction in MO buffer 320(1) | 000110000000, 000110010100 |
| 12 | move c | execute c and load profile in MO profile 350(1) | 010011000000, 000110010100 |
| 13 | move b | no fetch | 010011000000, 000110010100 |
| 14 | move c | no fetch | 010011000000, 000110010100 |
| 15 | move b | no fetch | 010011000000, 000110010100 |
| 16 | move d | moved | 010011000000, 000110010100 |
| 17 | move c | no fetch | 010011000000, 000110010100 |
| 18 | move c | no fetch | 010011000000, 000110010100 |

The instructions listed in Table 1 are included in order to represent example instructions for illustration purposes only. In the first entry of the table, an instruction to move "a" is received at processing element 250. The move a instruction, upon being decoded at decode module 330, includes a command to store the instruction in MO buffer 320(1). As a result, the instruction is loaded into MO buffer 320(1) and executed at execution unit 340 from instruction buffer 310. Entry number two involves an add b instruction.

The third entry, involving a subsequent move a instruction, is replaced with a command to load MO buffer 350(1). The load MO profile command loads MO profile 350(1) in addition to indicating that the move a instruction previously stored in MO buffer 320(1) is to be simultaneously executed. Note that the profile column entry three in Table 1 is not pointing to the first profile bit. Instead, the profile pointer points to the first profile bit in the fourth entry In the fourth entry, an instruction to move an instruction "b" is received. The move b instruction includes a command to store the instruction in MO buffer 320(2). As shown in the profile column of the fourth entry, the first profile bit (in bold) pointed to by MO pointer 360(1) is inactive. Accordingly, the move b instruction is executed from instruction buffer 310 at execution unit 340 and loaded into MO buffer 320(2).

Entry five includes a second move b instruction. This move b instruction is replaced with the command to load a corresponding profile for the move b instruction into MO profile buffer 350(2). Consequently, at the same time, the instruction is executed from MO buffer 320(2) and the profile is loaded into MO profile buffer 350(2). The profile column for the entry now shows the profiles stored in MO profile buffer 350(1) (e.g., the profile bit 2 is inactive) and profile buffer 350(2).

Entry six involves an add c instruction. The profile column shows that the third and first profile bits for the respective profiles are inactive Thus, the add c instruction is executed from instruction buffer 310. The following entry is another move a instruction. However, since the profile bit in MO profile buffer 350(1) is active, the move a instruction is executed from MO buffer 320(1). The same scenario occurs in entry eight where another move a instruction is received. Therefore, the instruction is again executed from MO buffer 320(1).

The ninth table entry includes a move b instruction. Similar to above, the profile bit in MO profile buffer 350(2) is active, indicating that the move b instruction is to be executed from MO buffer 320(2). The same condition occurs in entry ten where another move b instruction is received. Again, the instruction is executed from MO buffer 320(2). As described above, the instruction that is determined to be the most often used instruction can be dynamically changed.

The eleventh entry illustrates such an occurrence where an instruction to move "c" is received. The move c instruction, upon being decoded at decode module 330, includes an a command to store the instruction in MO buffer 320(1). As a result, the instruction replaces the previous instruction in MO buffer 320(1) and is executed at execution unit 340 from instruction buffer 310.

The twelfth entry includes another move c instruction. This move c instruction is replaced with a command to load a profile into MO profile buffer 350(1), and to execute the move c instruction loaded into MO buffer 320(1). Thus, the instruction is executed from instruction buffer 320(1) and the corresponding profile is loaded into MO profile buffer 350(1), replacing the previous profile corresponding to the move a instruction. In the following entry, a move b instruction is included. Consequently, the profile bit in MO profile buffer 350(2) is active, indicating that the move b instruction is to be executed from MO buffer 320(2).

The fourteenth entry includes a subsequent move c instruction. However, since the profile bit in MO profile buffer 350(1) is active, the move c instruction is executed from MO buffer 320(1). In the following entry, the profile column indicates that the move b instruction is to be executed from MO buffer 320(2). In the sixteenth entry, a move "d" instruction is received. However, notice that this instruction does not include any most often commands. In such an instance it is likely that this instruction is not executed enough to gain an advantage by storing in a MO buffer 320. The final two entries include instructions being executed from the MO buffers 320.

The above described instruction compaction method enables a 50% reduction in the amount of instructions that are fetched (e.g., out of 18 instructions, only 9 were executed from instruction buffer 310). Therefore, the bandwidth and size of instruction buffer 310 is reduced since the amount of instructions that need to be stored is compacted. As a result, the silicon area requirements for DSP 100 is also reduced. Moreover, the power consumption of DSP 100 is lowered since each processing element 250 fetches less instructions from instruction buffer 310.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

Thus, a memory optimization method has been described.

What is claimed is:

1. A processing element comprising:

an instruction buffer;

a first most often (MO) buffer coupled to the instruction buffer;

an execution unit coupled to the instruction buffer to execute instructions stored within the first MO buffer based upon a first predetermined profile;

a decode module, coupled to the instruction buffer, the first MO buffer, and the execution unit, to decode an instruction to determine whether the instruction is to be stored in the first MO buffer;

a second MO buffer coupled to the instruction buffer and the decode module;

first profile buffer coupled to the first MO buffer to store the first predetermined profile; and a second profile buffer coupled to the second MO buffer to store the second predetermined profile.

2. The processing element of claim 1 wherein the execution unit executes instructions stored within the second MO buffer based upon a second predetermined profile.

3. The processing element of claim 2 wherein the decode module decodes an instruction to determine whether the instruction is to be stored in the first MO buffer or the second MO buffer.

4. The processing element of claim 2 wherein the first and second predetermined profiles each include a plurality of profile bits, each profile bit indicating whether a corresponding instruction is to be executed at the execution unit during a particular instruction fetch cycle.

5. The processing element of claim 4 further comprising:

a first profile pointer coupled to the first profile buffer; and a second profile pointer coupled to the second profile buffer.

6. The processing element of claim 5 wherein the first profile pointer points to a first profile bit of the first predetermined profile during a first instruction fetch cycle.

7. The processing element of claim 6 wherein an instruction stored in the first MO buffer is executed at the execution unit during the first instruction fetch cycle if the first profile bit is active.

8. The processing element of claim 6 wherein an instruction stored in the instruction buffer is executed at the execution unit during the first instruction fetch cycle if the first profile bit is inactive.

9. A digital signal processor (DSP) comprising:

a plurality of processing elements, wherein each of the processing elements comprises:

an instruction buffer;

a first most often (MO) buffer coupled to the instruction buffer;

a second most often (MO) buffer coupled to the instruction buffer;

an execution unit coupled to the instruction buffer to execute instructions stored within the first MO buffer based upon a first predetermined profile and to execute instructions stored within the second MO buffer based upon a second predetermined profile;

a decode module, coupled to the instruction buffer, the first MO buffer, the second MO buffer and the execution unit, to decode an instruction to determine whether the instruction is to be stored in the first MO buffer or the second MO buffer; and a first profile buffer coupled to the first MO buffer to store the first predetermined profile; and a second profile buffer coupled to the second MO buffer to store the second predetermined profile.

10. The DSP of claim 9 wherein the first and second predetermined profiles each include a plurality of profile bits, each profile bit indicating whether a corresponding instruction is to be executed at the execution unit during a particular instruction fetch cycle.

11. The DSP of claim 10 wherein each processing element further comprises:

a first profile pointer coupled to the first profile buffer; and a second profile pointer coupled to the second profile buffer.

12. The DSP of claim 11 wherein the first profile pointer points to a first profile bit of the first predetermined profile during a first instruction fetch cycle.

13. A method comprising:

receiving a first instruction from an instruction buffer;

examining a bit within the first instruction to determine if the first instruction is to be stored in a first buffer;

determining whether the first instruction includes a command to load a profile if the first instruction has not been designated to be stored in the first buffer; and loading the profile in a second buffer if the first instruction has not been designated to be stored in the first buffer.

14. The method of claim 13 further comprising executing the first instruction.

15. The method of claim 13 further comprising:

storing the first instruction in the first buffer if it is determined that the first instruction is to be stored in the first buffer; and executing the first instruction from the instruction buffer.

16. The method of claim 13 further comprising:

retrieving the first instruction from the first buffer if the bit indicates that the first instruction is to be retrieved from the first buffer; and executing the first instruction after it has been retrieved from the first buffer.

17. The method of claim 16 further comprising executing the first instruction after it has been retrieved from the second buffer if it is determined that the first instruction does not include a command to load a profile and if the first instruction has not been designated to be stored in the first buffer.

18. An article of manufacture including one or more computer readable media that embody a program of instructions, wherein the program of instructions, when executed by a processing unit, causes the processing unit to:

receive a first instruction from an instruction buffer;

examine a bit within the first instruction to determine if the first instruction is to be stored in a first buffer;

determine whether the first instruction includes a command to load a profile if the first instruction has not been designated to be stored in the first buffer; and load the profile in a second buffer if the first instruction has not been designated to be stored in the first buffer.

19. The article of claim 18 wherein the program of instructions, when executed by a processing unit, further causes the processing unit to execute the first instruction.

20. The article of claim 18 wherein the program of instructions, when executed by a processing unit, further causes the processing unit to:

store the first instruction in the first buffer if it is determined that the first instruction is to be stored in the first buffer; and execute the first instruction from the instruction buffer.

21. The article of claim 18 wherein the program of instructions, when executed by a processing unit, further causes the processing unit to:

retrieve the first instruction from the first buffer if the bit indicates that the first instruction is to be retrieved from the first buffer; and execute the first instruction after it has been retrieved from the first buffer.

22. The article of claim 21 wherein the program of instructions, when executed by a processing unit, further causes the processing unit to execute the first instruction after it has been retrieved from the second buffer if it is determined that the first instruction does not include a command to load a profile and if the first instruction has not been designated to be stored in the first buffer.

* * * * *